(12) United States Patent
Huynh et al.

(10) Patent No.: US 11,630,215 B2
(45) Date of Patent: Apr. 18, 2023

(54) DETERMINING METRICS OF A CLOUD ATMOSPHERE USING TIME-DIFFERENCE MEASUREMENTS

(71) Applicant: Rosemount Aerospace Inc., Burnsville, MN (US)

(72) Inventors: Cuong Tho Huynh, Eagan, MN (US); Kaare Josef Anderson, Farmington, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 653 days.

(21) Appl. No.: 16/275,152

(22) Filed: Feb. 13, 2019

(65) Prior Publication Data

US 2020/0257001 A1 Aug. 13, 2020

(51) Int. Cl.
*G01S 17/95* (2006.01)

(52) U.S. Cl.
CPC .................... *G01S 17/95* (2013.01)

(58) Field of Classification Search
CPC ...... G01S 17/95; G01S 7/4865; G01S 7/4802; G01S 17/10; Y02A 90/10; G01N 2201/0214; G01N 21/4738; G01N 2021/4709; G01N 2021/1795; G01N 21/00; G01N 15/02

See application file for complete search history.

(56) References Cited

U.S. PATENT DOCUMENTS

| | | | |
|---|---|---|---|
| 3,519,354 A * | 7/1970 | Hazel | G01N 21/538 356/342 |
| 5,206,698 A | 4/1993 | Werner et al. | |
| 5,913,159 A * | 6/1999 | Muirhead | H04B 17/327 455/226.4 |
| 7,656,526 B1 | 2/2010 | Spuler et al. | |
| 2003/0081662 A1* | 5/2003 | Rick | G01S 5/0221 375/150 |

(Continued)

FOREIGN PATENT DOCUMENTS

| | | | |
|---|---|---|---|
| CN | 103675791 A | 3/2014 | |
| DE | 102007021452 | * 1/2013 | ......... G01N 15/0205 |
| GB | 2075300 | * 6/1980 | ............... G01S 7/28 |

OTHER PUBLICATIONS

Extended European Search Report dated Jul. 7, 2020, received for corresponding European Application No. 19213531.7, 7 pages.

*Primary Examiner* — Alexander Satanovsky
(74) *Attorney, Agent, or Firm* — Kinney & Lange, P.A.

(57) ABSTRACT

Apparatus and associated methods relate to determining metrics of a cloud atmosphere using time difference measurements. A light projector projects a pulse of light into a cloud atmosphere, and a light sensor detects a portion of the projected pulse of light backscattered by the cloud atmosphere. A backscatter coefficient is calculated based on peak amplitude of the detected portion. An optical extinction coefficient is calculated based on a time difference between a peak time and a post-peak time, which correspond to times at which the peak amplitude of the detected portion occurs and at which the detected portion equals or crosses a sub-peak threshold, respectively. In some embodiments, a logarithm amplifier is used to facilitate processing of signals of widely varying amplitudes. In some embodiments, the sub-peak threshold is calculated as a fraction of the peak amplitude of the detected portion.

14 Claims, 7 Drawing Sheets

(56) References Cited

U.S. PATENT DOCUMENTS

| | | |
|---|---|---|
| 2011/0019188 A1 | 1/2011 | Ray et al. |
| 2013/0103317 A1 | 4/2013 | Ray et al. |
| 2013/0142239 A1* | 6/2013 | Kawasaki ............ H04B 1/0475 375/224 |
| 2017/0268993 A1* | 9/2017 | Anderson ............. G01S 7/4802 |
| 2018/0024036 A1 | 1/2018 | Ray et al. |
| 2018/0313736 A1 | 11/2018 | Ray et al. |

* cited by examiner

DETERMINING METRICS OF A CLOUD ATMOSPHERE USING TIME-DIFFERENCE MEASUREMENTS

BACKGROUND

When an aircraft travels through a cloud atmosphere, there can be a potential for ice formation or accretion on the aircraft. If the ice forms on the aircraft, the aircraft's flight might be jeopardized, especially if ice forms on control surfaces and/or lift surfaces. Not every cloud atmosphere, however, presents a dangerous risk of ice formation or accretion on an aircraft. Various cloud atmospheres can have various atmospheric conditions, such as having various water-droplet size distributions, various ice/liquid ratios, various air temperatures, etc. Such water-droplet size distributions and ice/liquid ratios can be determined as metrics of the cloud atmosphere using various instruments and methods.

Some aircraft are equipped with such instruments so as to detect, measure, and/or determine such metrics of the cloud atmosphere. These detected, measured, and/or determined metrics can be used to predict whether a particular cloud atmosphere might present conditions conducive to ice formation or accretion on an aircraft. Such metrics can even be used to predict the location(s) on the aircraft where such ice formation or accretion could be expected. One such system for measuring cloud metrics is called an Optical Icing Conditions Detector (OICD). Some OICD systems are configured to direct a pulse(s) of light into the cloud atmosphere. Such an OICD system then detects a portion of the pulse(s) of light backscattered by the cloud atmosphere, and uses these detected portions to determine risk of ice formation or accretion on the aircraft.

Complex signal analyses of these reflected light signals can be performed to determine various metrics of the cloud atmosphere. Such complex signal analyses can require powerful computer systems and extensive computations. Such powerful computer systems that are required for performing such extensive computations can be voluminous, heavy, high power-consuming, and/or expensive.

SUMMARY

Apparatus and associated methods related to a system for determining a metric of a cloud atmosphere. The system includes a light projector configured to project a pulse of light into a cloud atmosphere. The system includes a light sensor configured to detect a portion of the projected pulse of light backscattered by the cloud atmosphere. The system includes a peak detector configured to determine peak amplitude of the detected portion. The system includes a timer configured to determine a time difference between a first reference time and a second reference time. The first reference time corresponds to either a time at which the peak amplitude of the detected portion occurs or a time at which the detected portion equals or crosses a first sub-peak threshold. The second reference time corresponds to a time at which the detected portion equals or crosses a second sub-peak threshold. The system also includes one or more processors and computer-readable memory. The computer-readable memory is encoded with instructions that, when executed by the one or more processors, cause the system to calculate, based on the peak amplitude of the detected portion, a backscatter coefficient. The computer-readable memory is further encoded with instructions that, when executed by the one or more processors, cause the system to calculate, based on the time difference between the first and second reference times, an optical extinction coefficient. The computer-readable memory is encoded with instructions that, when executed by the one or more processors, cause the system to calculate, based on the calculated backscatter and optical extinction coefficients, the metric of the cloud atmosphere.

Some embodiments relate to a method for determining a metric of a cloud atmosphere. The method includes projecting, via a light projector, a pulse of light into a cloud atmosphere. The method includes detecting, via a light sensor, a portion of the projected pulse of light backscattered by the cloud atmosphere. The method includes determining, via a peak detector, peak amplitude of the detected portion. The method includes determining, via a timer, a time difference between a first reference time and a second reference time. The first reference time corresponds to either a time at which the peak amplitude of the detected portion occurs or a time at which the detected portion equals or crosses a first sub-peak threshold. The second reference time corresponds to a time at which the detected portion equals or crosses a second sub-peak threshold. The method includes calculating, based on the peak amplitude of the detected portion via a processor, a backscatter coefficient. The method includes calculating, based on the time difference between the first reference time and the second reference time via a processor, an optical extinction coefficient. The method also includes calculating, based on the calculated backscatter and optical extinction coefficients via a processor, the metric of the cloud atmosphere.

Some embodiments relate to a system for determining a metric of a cloud atmosphere. The system includes a light projector configured to project a pulse of light into a cloud atmosphere. The system includes a light sensor having a detection surface aligned with the laser projector so as to detect a portion of the projected pulse of light backscattered by the cloud atmosphere. The light sensor is further configured to generate, at an output port of the light sensor, a detection signal indicative of the detected portion. The system includes a logarithm amplifier having an input port electrically coupled to the output port of the detector so as to receive therefrom the detection signal. The logarithm amplifier is configured to generate, at an output port of the logarithm amplifier, an amplified signal indicative of a logarithm of the detection signal. The system includes a peak detector having an input port electrically coupled to the output port of the logarithm amplifier so as to receive therefrom the amplified signal. The peak detector is configured to generate, at an output port of the peak detector, a peak signal indicative of a peak amplitude of an amplified signal. The system includes a timer configured to determine a time difference between a first reference time and a second reference time. The first reference time corresponds to either a time at which the peak amplitude of a logarithm signal occurs or a time at which the amplitude of the logarithm signal equals or crosses a first sub-peak threshold. The second reference time corresponds to a time at which the amplitude of the logarithm signal equals or crosses a second sub-peak threshold. The system also includes a cloud metric calculator. The cloud metric calculator is configured to calculate, based on the peak signal, a backscatter coefficient. The cloud metric calculator is further configured to calculate, based on the determined time difference between the first reference time and the second reference time, an optical extinction coefficient. The cloud metric calculator is further configured to calculate, based on the calculated backscatter and optical extinction coefficients, the metric of the cloud atmosphere.

DETAILED DESCRIPTION

Apparatus and associated methods relate to determining metrics of a cloud atmosphere using time difference measurements. A light projector projects a pulse of light into a cloud atmosphere, and a light sensor detects a portion of the projected pulse of light backscattered by the cloud atmosphere. A backscatter coefficient is calculated based on peak amplitude of the detected portion. An optical extinction coefficient is calculated based on a time difference between a peak time and a post-peak time, which correspond to times at which the peak amplitude of the detected portion occurs and at which the detected portion equals or crosses a sub-peak threshold, respectively. In some embodiments, a logarithm amplifier is used to facilitate processing of signals. In some embodiments, the sub-peak threshold is calculated as a fraction of the peak amplitude of the detected portion.

Such apparatus and methods facilitate determination of such cloud conditions metrics using a reduced number of signal values. By using a reduced number of signal values, a low-speed analog-to-digital converter and/or a low-speed microprocessor can be used for calculating various cloud metrics. Instead of using a high-speed analog-to-digital converter for sampling of light signals reflected from clouds, only a limited number of samples of the reflected light signals are taken when specific sub-peak thresholds have been crossed by a detection signal. The number of samples taken is greater than or equal to the number of model parameters to be calculated. The calculated model parameters then can be used to determine the various cloud metrics.

Figure 1:
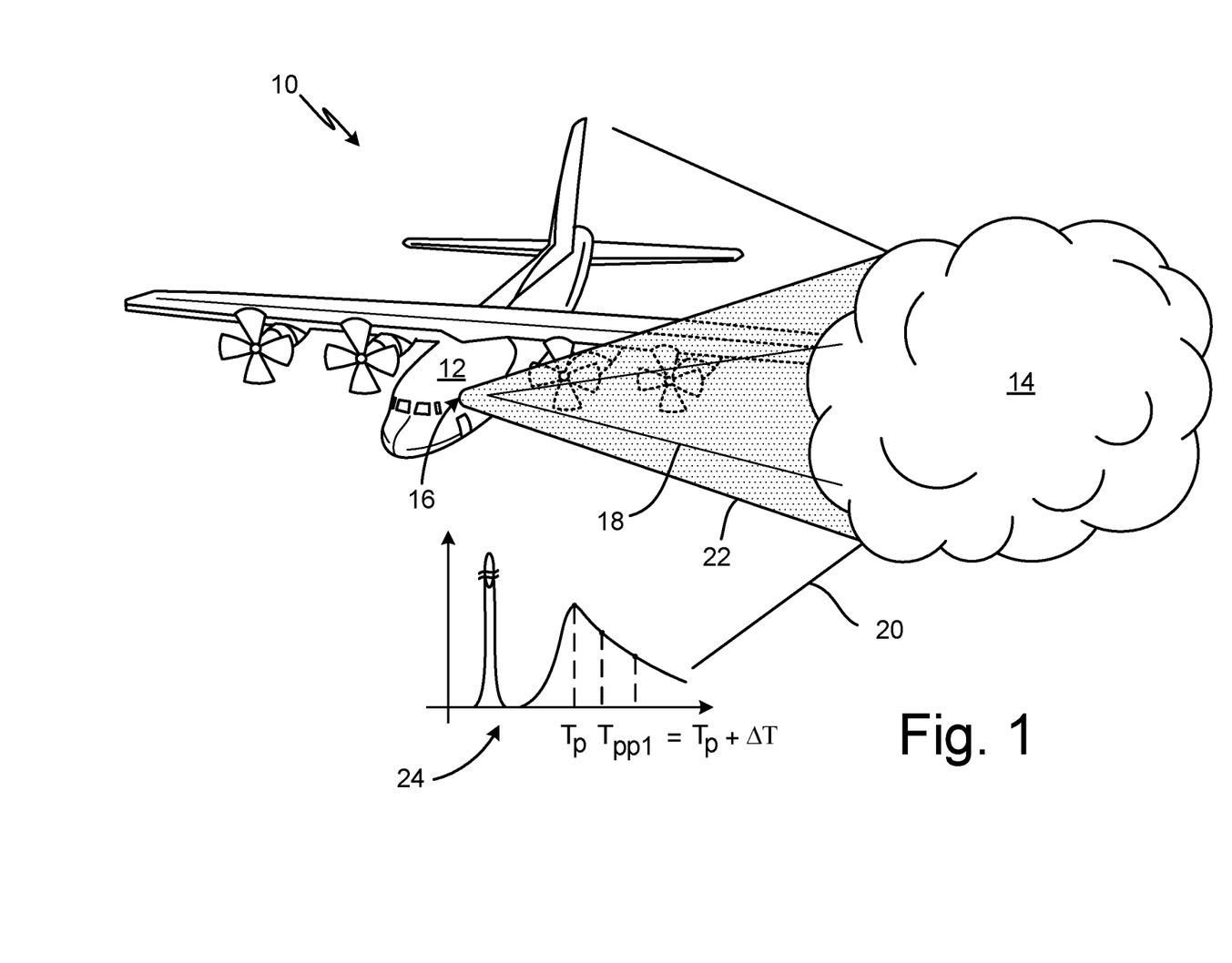
FIG. 1 is a diagram illustrating a scene in which an aircraft is determining metrics of a cloud atmosphere using time-difference measurements.

FIG. 1 is a diagram illustrating a scene in which an aircraft is determining metrics of a cloud atmosphere using time-difference measurements. In FIG. 1, scene 10 depicts aircraft 12 flying near cloud atmosphere 14. Aircraft 12 includes system 16 for determining metrics of cloud atmosphere 14 using time difference ΔT measurements. While illustrated as an airplane, aircraft 12 can be any airborne vehicle for which it is desirable to determine metrics of cloud atmosphere 14 in or near which aircraft 12 is located. System 16 is depicted as being onboard aircraft 12 and is configured to project pulse of light 18 into cloud atmosphere.

Cloud atmosphere 14 can be populated by a variety of particles including, among others, liquid water droplets, ice crystals, sand, dust, volcanic ash, and aerosols. Some of projected pulse 18 is backscattered by such particles of cloud atmosphere 14, thereby forming backscattered pulse 20. Portion 22 of backscattered pulse is incident upon system 12 and can be detected thereby. System 16 can then use attributes of detected portion 22 to determine various metrics of cloud atmosphere 14. Specifically, system 16 can use time difference $\Delta T$ between peak time $T_P$ and post-peak time $T_{PP}$ to determine an optical extinction coefficient, as illustrated in graph 24.

Figure 2:
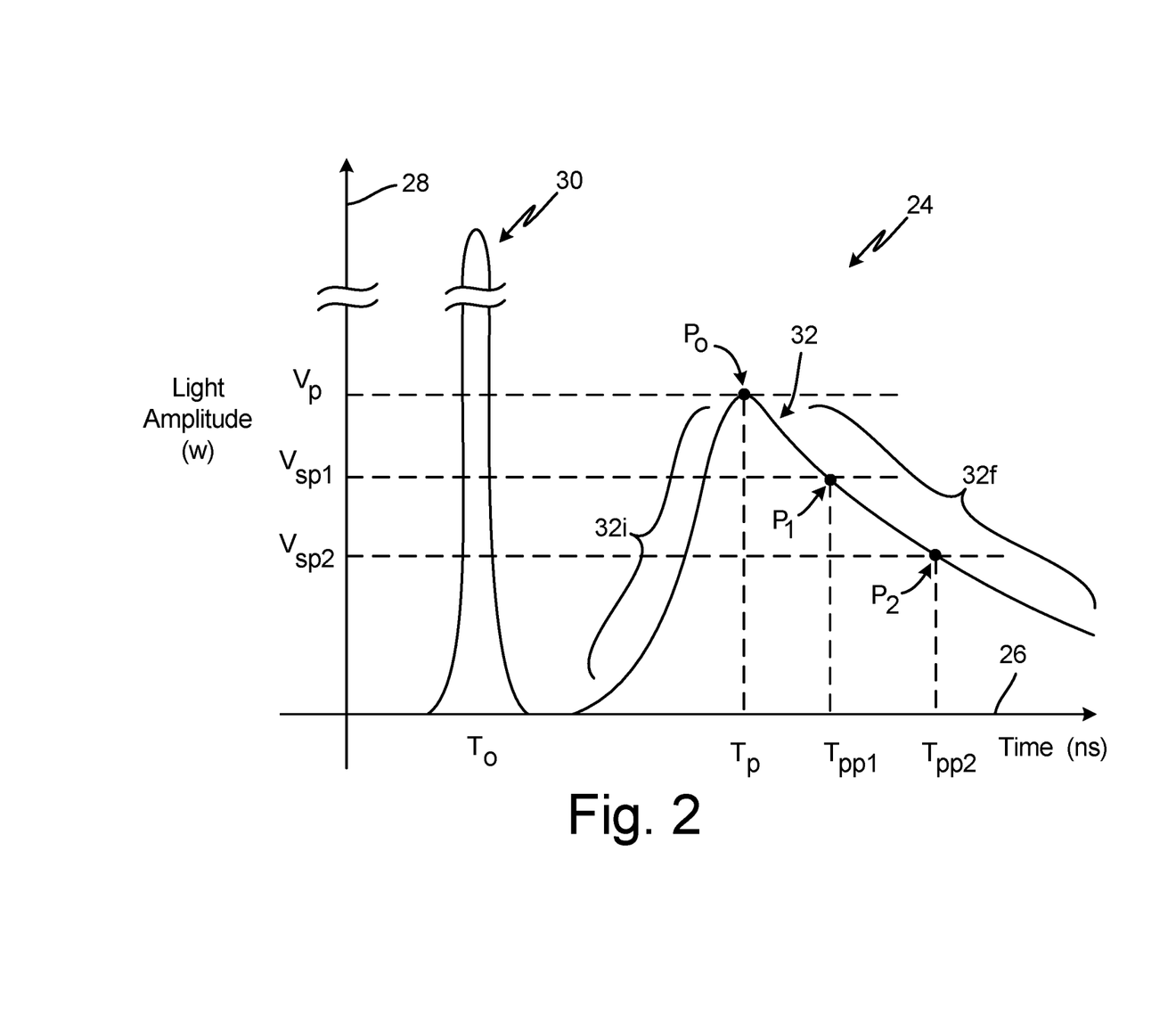
FIG. 2 is a graph illustrating the temporal relation of the detected portion of light backscattered by the cloud atmosphere.

FIG. 2 is a graph illustrating the temporal relation of the detected portion of light backscattered by the cloud atmosphere. In FIG. 2, graph 24 shown in FIG. 1 is depicted in greater detail. Graph 24 includes horizontal axis 26, vertical axis 28 and light-amplitude/time relations 30 and 32. Horizontal axis 26 indicates time (e.g., in nanoseconds), and vertical axis 28 indicates light-amplitude (e.g., in Watts). Light-amplitude/time relation 30 corresponds to projected pulse 18 of light (depicted in FIG. 1). Light-amplitude/time relation 30 is a narrow pulse located at time $T_0$. Light-amplitude/time relation 32 corresponds to backscattered portion 22 of projected pulse 18 (both depicted in FIG. 1). Light-amplitude/time relation 32 has rapidly increasing initial portion $32i$ that increases until light-amplitude/time relation 32 reaches point $P_0$ where peak amplitude $V_P$ occurs at time $T_P$, after which follows slowly-decaying final portion $32f$.

The shape of light-amplitude/time relation 32 is indicative of the nature of cloud atmosphere 14, from which detected portion 22 is backscattered. For example, peak amplitude $V_P$ of light-amplitude/time relation 32 can be used to determine a backscatter coefficient β, which is a metric that can be used to determine other metrics of the cloud atmosphere 14. For example, backscatter coefficient β can be determined as follows:

$$\beta = hV_P. \qquad (1)$$

In equation (1), h is simply a weighting coefficient.

The nature of slowly-decaying final portion $32f$ of light-amplitude/time relation 32 can be used to determine an optical extinction coefficient α. Optical extinction coefficient α can also be used, alone or with backscatter coefficient β, to determine other metrics of cloud atmosphere 14. Various manners of characterizing slowly-decaying final portion $32f$ can be used. FIG. 2 depicts using points $P_1$ and $P_2$ that lie on light-amplitude/time relation 32 in slowly-decaying final portion $32f$. First point $P_1$ occurs at time $T_{PP1}$ at which time light-amplitude/time relation 32 equals or crosses sub-peak threshold $V_{SP1}$. Second point $P_2$ occurs at time $T_{PP2}$ at which time light-amplitude/time relation 32 equals or crosses sub-peak threshold $V_{SP2}$. The values of post-peak times $T_1$ and $T_2$ as well as the values of sub-peak thresholds $V_{SP1}$ and $V_{SP2}$ can be used to determine optical extinction coefficient α as follows:

$$\alpha = k \frac{\ln\left(\frac{V_1}{V_2}\right)}{T_1 - T_2}. \qquad (2)$$

In equation (2), k is simply a weighting coefficient. In some embodiments, more than two points can be used to determine optical extinction coefficient. For example, in some embodiments a least squares fit can be performed on three or more points obtained in slowly-decaying final portion 32f of light-amplitude/time relation 32. Conversely, in some embodiments a single point can be used in conjunction with the peak of light-amplitude/time relation 32 to determine optical extinction coefficient α.

In various embodiments various reference times can be used to determine optical extinction coefficient α. For example, any two or more of peak time T0 and post-peak times T1 and T2 can be used to determine optical extinction coefficient α.

Figure 3:
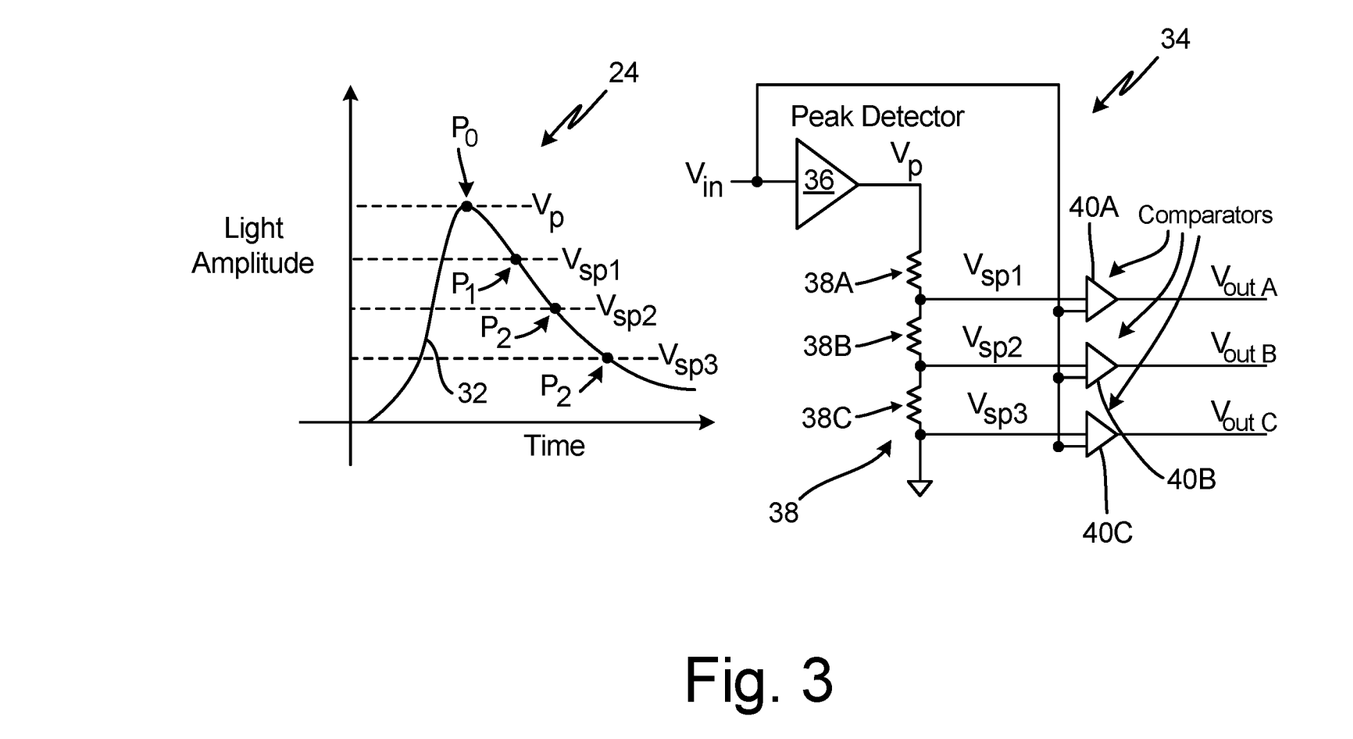
FIG. 3 is a schematic diagram illustrating a method of determining three post-peak points of the light-amplitude/time relation depicted in FIG. 2.

FIG. 3 is a schematic diagram illustrating a method of determining three post-peak points of the light-amplitude/time relation depicted in FIG. 2. In FIG. 3, graph 24 depicted in FIGS. 1 and 2 is reproduced, but with three post-peak points P1-P3 notated. Peak amplitude $V_P$ of light-amplitude/time relation 32 is also notated. Also depicted in FIG. 3 is schematic diagram 34, which illustrates a circuit capable of generating sub-peak threshold levels $V_{SP1}$-$V_{SP3}$. Schematic diagram 34 has peak detector 36, resistor divider network 38 and comparators 40A-40C.

Peak detector 36 has an input terminal electrically receiving the signal indicative of detected portion 22 of projected pulse of light 18 backscattered by cloud atmosphere 14 (shown in FIG. 1). Peak detector 36 is configured to detect the peak amplitude of the signal indicative of detected portion 22 and hold the detected peak amplitude $V_P$ at an output terminal.

Resistor divider network 38 is configured to generate the sub-peak threshold levels $V_{SP1}$-$V_{SP3}$. Resistor divider network 38 includes series connected resistors 38A-38C, which perform such operation. Resistor divider network 38 receives the peak amplitude $V_P$ from peak detector 36 and generates sub-peak threshold levels $V_{SP1}$-$V_{SP3}$ at each of the series connection points between series connected resistors 38A-38C.

Comparators 40A-40C compare sub-peak threshold levels $V_{SP1}$-$V_{SP3}$ generated by series connected resistors 38A-38C, respectively, and generate output signals $V_{outA}$-$V_{outC}$ indicative of times at which detected portion 22 equals or crosses the respective sub-peak threshold levels $V_{SP1}$-$V_{SP3}$.

Figure 4:
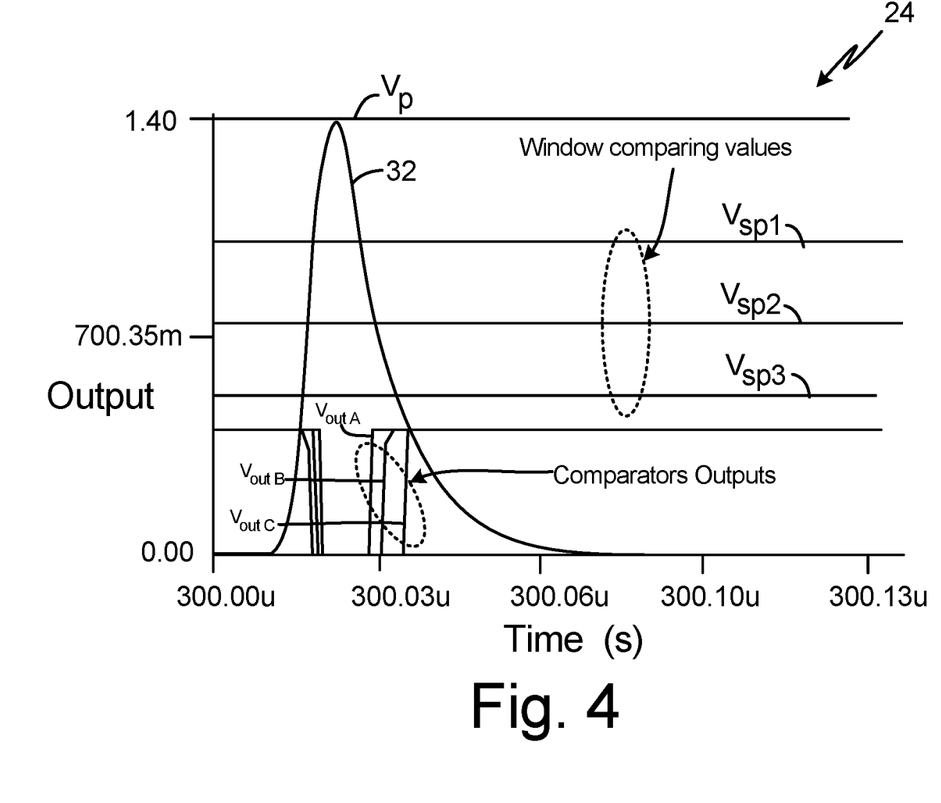
FIG. 4 is a graph depicting the various signals described above with reference to FIG. 3.

FIG. 4 is a graph depicting the various signals described above with reference to FIG. 3. Specifically, graph 24 depicts light-amplitude/time relation 32 shown in all of FIGS. 1-3, but also shows output signals $V_{outA}$-$V_{outC}$ generated by comparators 40A-40C depicted in FIG. 3. Each of output signals $V_{outA}$-$V_{outC}$ are low when light-amplitude/time relation 32 is greater than corresponding sub-peak threshold values $V_{SP1}$-$V_{SP3}$. Each of output signals $V_{outA}$-$V_{outC}$ then transitions from low to high when light-amplitude/time relation 32 is equal to or crosses over corresponding sub-peak threshold values $V_{SP1}$-$V_{SP3}$. In other words, the times of such transitions indicate the times at which detected portion 18 equals or falls below a corresponding sub-peak threshold.

Figure 5:
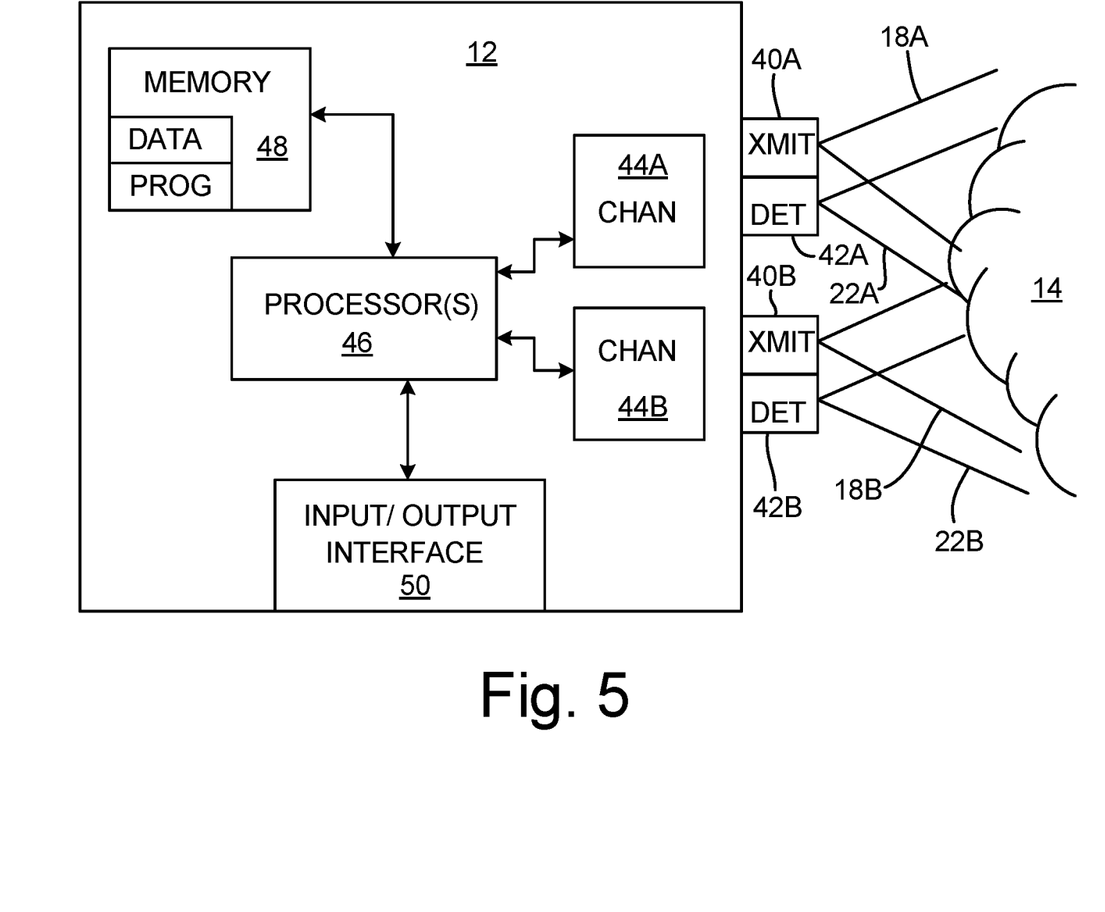
FIG. 5 is a block diagram of an exemplary system for determining metrics of a cloud atmosphere.

FIG. 5 is a block diagram of an exemplary system for determining metrics of a cloud atmosphere. In FIG. 5, system 12 has two channels for projecting pulses of light into cloud atmosphere 14 and detecting portions of such pulses of light backscattered by cloud atmosphere 14. System 12 includes light projectors 40A and 40B, light sensors 42A and 42B, channels 44A and 44B, processor(s) 46, memory 48, and input-output interface 50.

Light projectors 40A and 40B are shown projecting pulses of light 18A and 18B, respectively, into cloud atmosphere 12. Light sensors 42A and 42B are shown receiving portions 22A and 22B of projected pulses of light 18A and 18B backscattered by cloud atmosphere 14. Light projectors 40A and 40B and light sensors 42A and 42B are electrically connected to channels 44A and 44B, which condition signals between processor(s) 46 and light projectors 40A and 40B and light sensors 42A and 42B. An exemplary embodiment of channels 44A and 44B will be disclosed below with reference to FIG. 6.

Various embodiments can have several of the above disclosed elements as well as other various elements. For example, light projector 40A and/or 40B can be visible light projectors, infrared light projectors, or quasi-optical projectors projecting millimeter-wave electromagnetic waves. In some embodiments, light projector 40A and/or 40B can be a laser. Light sensors 42A and/or 42B can be photo-diodes, photo-sensors, focal plane arrays, or other photo sensitive detector. Light sensors 42A and/or 42B could also be a detector of millimeter-wave electromagnetic waves in some embodiments.

Processor(s) 46 can receive program instructions from program memory 48P. Processor(s) 46 can then execute program instructions to control system 12 so as to determine metrics of cloud atmosphere 14. Processor(s) 46, for example, might send commands to project pulses of light 18A and 18B so that channels 44A and 44B can provide processor with amplitude and timing data corresponding to the nature of detected portions 22A and 22B. Processor(s) 46 then can determine backscatter coefficient β and optical extinction coefficient α using such amplitude and timing data. Processor(s) 46 can then use backscatter coefficient β and optical extinction coefficient α to determine additional metrics of cloud atmosphere 14

For example, backscatter coefficient β and optical extinction coefficient α have been used to calculate metrics such as liquid-water content (LWC), droplet size distributions, and ice/liquid water ratios. Examples of such calculations are disclosed by Ray et al. in U.S. published application 2013/0103317, filed Oct. 25, 2011, titled "Methods of Determining the Liquid Water Content of a Cloud," the entire disclosure (henceforth referred to as "the '317 publication") of which is hereby incorporated by reference.

Processor(s) 46, in one example, is configured to implement functionality and/or process instructions for execution within system 12. For instance, processor(s) 46 can be capable of processing instructions stored in program memory 48P. Examples of processor(s) 46 can include any one or more of a microprocessor, a controller, a digital signal processor (DSP), an application specific integrated circuit (ASIC), a field-programmable gate array (FPGA), or other equivalent discrete or integrated logic circuitry.

Memory 48 can be configured to store information within system 12 during operation. Memory 48, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 48 is a temporary memory, meaning that a primary purpose of memory 48 is not long-term storage. Memory 48, in some examples, is described as volatile memory, meaning that memory 48 do not maintain stored contents when power to system 12 is turned off. Examples of volatile memories can include random access memories (RAM), dynamic random access memories (DRAM), static random access memories (SRAM), and other forms of volatile memories. In some examples, memory 48 is used to store program instructions for execution by processor(s) 46. Memory 48, in one example, is used by software or applications running on system 12 (e.g., a software program implementing calculations of cloud atmosphere metrics) to temporarily store information during program execution, such as, for example, in data memory 48D.

In some examples, memory 48 can also include one or more computer-readable storage media. Memory 48 can be configured to store larger amounts of information than volatile memory. Memory 48 can further be configured for long-term storage of information. In some examples, memory 48 includes non-volatile storage elements. Examples of such non-volatile storage elements can include magnetic hard discs, optical discs, flash memories, or forms of electrically programmable memories (EPROM) or electrically erasable and programmable (EEPROM) memories.

Input/output interface 50 can be used to communicate information between system 12 and an aircraft. In some embodiments, such information can include aircraft conditions, flying conditions, and/or atmospheric conditions. In some embodiments, such information can include data processed by system 12, such as, for example, alert signals. Input/output interface 50 can also include a communications module. Input/output interface 50, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Figure 6:
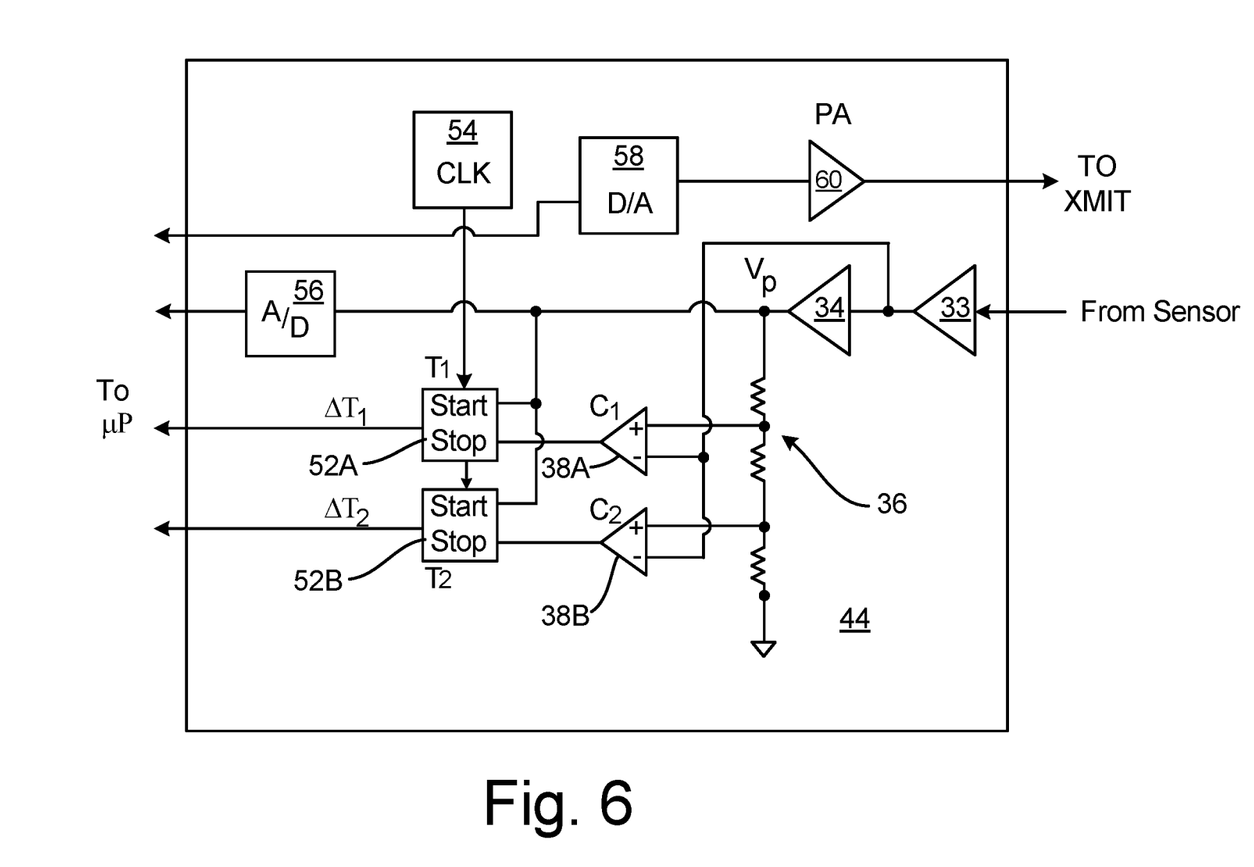
FIG. 6 is a schematic diagram of a channel, such as channels 44A and 44B depicted in FIG. 5.

FIG. 6 is a schematic diagram of a channel, such as channels 44A and 44B depicted in FIG. 5. Channel 44 includes amplifier 33, peak detector 34, resistor divider network 36, comparators 38A and 38B, timers 52A and 52B, clock generator 54, analog-to-digital (A/D) converter 56, digital-to-analog converter 58 and power amplifier 60.

Amplifier 33 is electrically coupled to light sensor 42A or 42B (depicted in FIG. 5) so as to receive therefrom a detection signal indicative of detected portion 22A or 22B. In some embodiments, amplifier 33 is a linear amplifier. In some embodiments, amplifier 33 is a logarithm amplifier configured to generate an output signal indicative of a logarithm of the detection signal so as to convert a decaying exponential signal into a linearly decreasing signal. In some embodiments, amplifier 33 includes one or more filters. Amplifier 33 generates an amplified signal at an output port of amplifier 33.

Figure 7:
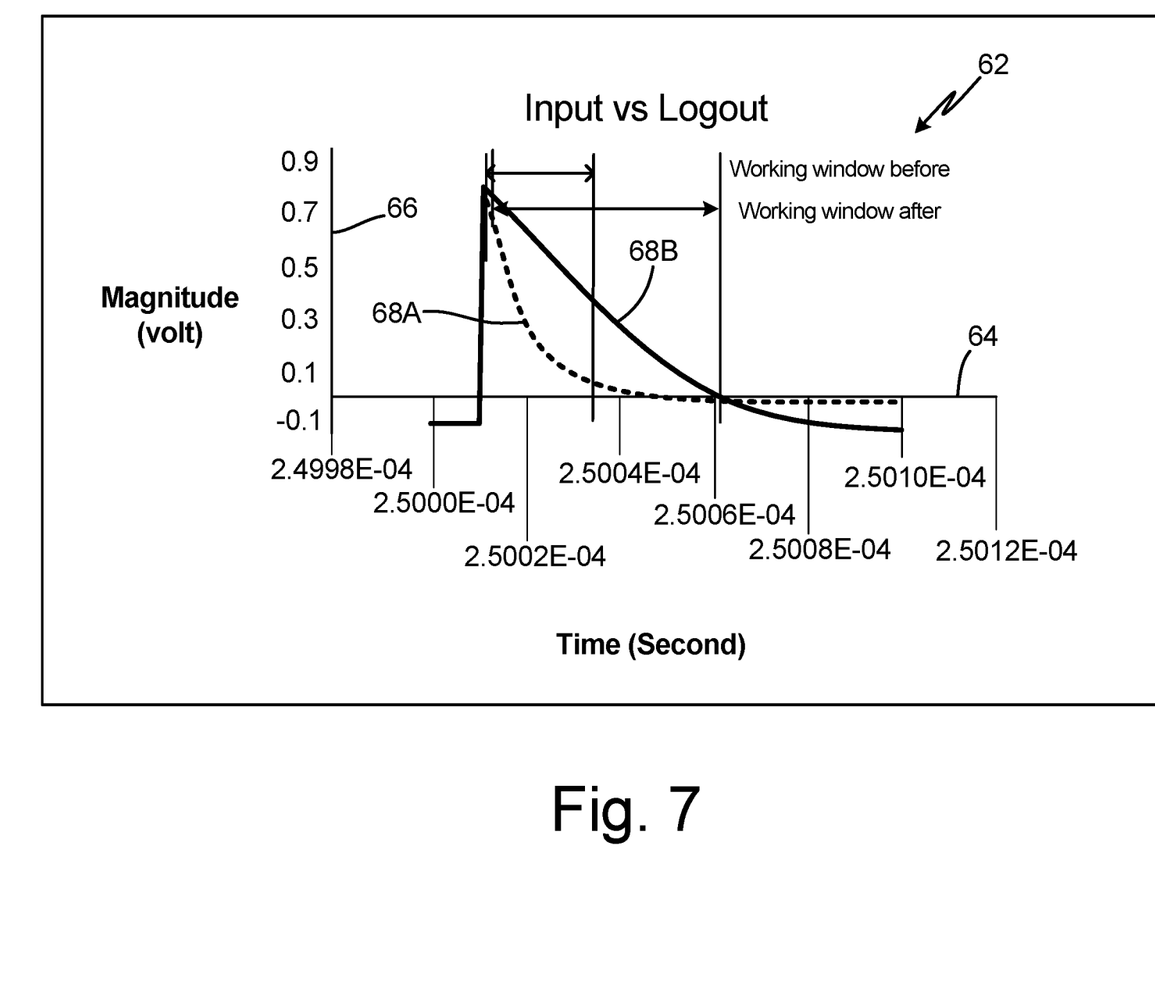
FIG. 7 is a graph depicting the output signals of both a linear amplifier and an exponential amplifier.

FIG. 7 is a graph depicting the output signals of both a linear amplifier and a logarithm amplifier. In FIG. 7, graph 62 includes horizontal axis 64, vertical axis 66, and output-amplitude/time relations 68A and 68B. Horizontal axis 64 is indicative of time in units of seconds, and vertical axis 66 is indicative of output amplitude in units of voltage. Output-amplitude/time relation 68A corresponds to an output signal of a linear amplifier, while output-amplitude/time relation 68B corresponds to an output signal of a logarithm amplifier. As can be seen in graph 62, the amplitude/time relation 68B corresponding to an output signal of a logarithm amplifier permits large variations of amplitudes of detection signals at the input port of the amplifier.

Peak detector 34 is electrically coupled to amplifier 33 so as to receive therefrom the amplified signal. Peak detector 34 generates a peak detection signal(s) at an output port of peak detector 34. The generated peak detection signal(s) is indicative of both peak amplitude and a time at which the peak amplitude is detected. In some embodiments, peak detector 34 can generate a single signal indicative of both the peak amplitude and the time at which the peak amplitude occurs. In other embodiments, peak detector 34 can generate two or more signals indicative of the peak amplitude and the time at which the peak amplitude is detected.

Resistor divider network 38 receives the peak detection signal(s) generated by peak detector 34 and generates sub-peak threshold signals $V_{SP1}$ and $V_{SP2}$ as disclosed above with reference to FIG. 3. Comparators 38A and 38B receive sub-peak threshold signals $V_{SP1}$ and $V_{SP2}$ generated by resistor divider network 36 and compare such received signals with the signal indicative of detected portion 22A or 22B generated by light sensor 42A or 42B. Comparators 22A and 22B then generate output signals $V_{outA}$ and $V_{outB}$, each of which is indicative of a time at which detected portion 22A or 22B equals or crosses thresholds generated by resistor divider network 36.

Timers 52A and 52B receive output signals $V_{outA}$ and $V_{outB}$ from comparators 38A and 38B, respectively. Timers 52A and 52B then determine time differences $\Delta T_1$ and $\Delta T_2$ between a peak time indicated by the output signal of peak detector 34 and a post-peak time indicated by output signals $V_{outA}$ and $V_{outB}$, respectively. Timers 52A and 52B receive a timing clock signal from clock generator 54. Timers 52A and 52B generate signals indicative of such determined time differences $\Delta T_1$ and $\Delta T_2$ and provide these generated signals for processor(s) 46 (depicted in FIG. 5). A/D converter 56 receives the output signal generated by peak detector 34 and provides a signal indicative of peak amplitude of detected portion 18A or 18B to microprocessor(s) 46.

D/A converter 58 is configured to receive from microprocessor(s) 46 a signal to command light projector to project pulse 18A or 18B of light into cloud atmosphere 14. In some embodiments, such a command signal is in the form of an amplitude envelope which is converted to analog via D/A converter 58. In some embodiments, such a command signal is simply a logic signal not requiring D/A converter 58. D/A converter 58 generates an analog output signal and provides such a generated output signal to power amplifier 60. Power amplifier 60 generates a signal that causes light projector 40A or 40B to project pulses 18A or 18B into cloud atmosphere 14 (depicted in FIG. 5).

Discussion of Possible Embodiments

The following are non-exclusive descriptions of possible embodiments of the present invention.

Apparatus and associated methods related to a system for determining a metric of a cloud atmosphere. The system includes a light projector configured to project a pulse of light into a cloud atmosphere. The system includes a light sensor configured to detect a portion of the projected pulse of light backscattered by the cloud atmosphere. The system includes a peak detector configured to determine peak amplitude of the detected portion. The system includes a timer configured to determine a time difference between a first reference time and a second reference time. The first reference time corresponds to either a time at which the peak amplitude of the detected portion occurs or a time at which the detected portion equals or crosses a first sub-peak threshold. The second reference time corresponds to a time at which the detected portion equals or crosses a second sub-peak threshold. The system also includes one or more processors and computer-readable memory. The computer-readable memory is encoded with instructions that, when executed by the one or more processors, cause the system to calculate, based on the peak amplitude of the detected portion, a backscatter coefficient. The computer-readable memory is further encoded with instructions that, when executed by the one or more processors, cause the system to calculate, based on the time difference between the first and second reference times, an optical extinction coefficient. The computer-readable memory is encoded with instructions that, when executed by the one or more processors, cause the system to calculate, based on the calculated backscatter and optical extinction coefficients, the metric of the cloud atmosphere.

The system of the preceding paragraph can optionally include, additionally and/or alternatively, any one or more of the following features, configurations and/or additional components:

A further embodiment of the foregoing system, wherein the light sensor can be further configured to generate a detection signal indicative of the detected portion.

A further embodiment of any of the foregoing systems, wherein the peak detector can be further configured to generate a peak signal indicative of the peak amplitude of the detection signal.

A further embodiment of any of the foregoing systems can further include a logarithm amplifier configured to generate a logarithm signal based on a logarithm of the detected portion.

A further embodiment of any of the foregoing systems can further include a logarithm amplifier configured to generate a logarithm signal based on a logarithm of the detection signal. The peak detector can be further configured to generate a peak signal indicative of peak amplitude of the logarithm signal.

A further embodiment of any of the foregoing systems can further include a threshold generator configured to calculate the second sub-peak threshold, wherein the second sub-peak threshold is indicative of a predetermined fraction of the peak amplitude of the detected portion.

A further embodiment of any of the foregoing systems can further include a threshold generator configured to calculate the second sub-peak threshold. The second sub-peak threshold is indicative of a predetermined fraction of the peak amplitude of the detected signal. The threshold generator is further configured to generate a threshold signal indicative the predetermined fraction of the peak signal.

A further embodiment of any of the foregoing systems can further include a threshold generator configured to calculate the second sub-peak threshold. The second sub-peak threshold is indicative of a predetermined fraction of the peak amplitude of the peak signal. The threshold generator is further configured to generate a threshold signal indicative the predetermined fraction of the peak signal.

A further embodiment of any of the foregoing systems can further include a comparator configured to compare the detection portion with the second sub-peak threshold.

A further embodiment of any of the foregoing systems can further include a comparator configured to compare the detection signal with the threshold signal. The comparator is further configured to generate a comparison signal indicative of a comparison of the detection signal and the threshold signal.

A further embodiment of any of the foregoing systems can further include a comparator configured to compare the detection signal with the threshold signal. The comparator is further configured to generate a comparison signal indicative of a comparison of the detection signal and the threshold signal.

A further embodiment of any of the foregoing systems, wherein the calculated could metric is selected from the list consisting of liquid water content, droplet size distributions, and ice/liquid water ratios.

Some embodiments relate to a method for determining a metric of a cloud atmosphere. The method includes projecting, via a light projector, a pulse of light into a cloud atmosphere. The method includes detecting, via a light sensor, a portion of the projected pulse of light backscattered by the cloud atmosphere. The method includes determining, via a peak detector, peak amplitude of the detected portion. The method includes determining, via a timer, a time difference between a first reference time and a second reference time. The first reference time corresponds to either a time at which the peak amplitude of the detected portion occurs or a time at which the detected portion equals or crosses a first sub-peak threshold. The second reference time corresponds to a time at which the detected portion equals or crosses a second sub-peak threshold. The method includes calculating, based on the peak amplitude of the detected portion via a processor, a backscatter coefficient. The method includes calculating, based on the time difference between the first reference time and the second reference time via a processor, an optical extinction coefficient. The method also includes calculating, based on the calculated backscatter and optical extinction coefficients via a processor, the metric of the cloud atmosphere.

The method of the preceding paragraph can optionally include, additionally and/or alternatively, any one or more of the following features, configurations and/or additional components:

A further embodiment of the foregoing method can further include determining, via a logarithm amplifier, a logarithm of the detected portion.

A further embodiment of any of the foregoing methods can further include calculating, via a threshold generator, the second sub-peak threshold, wherein the second sub-peak threshold is indicative of a predetermined fraction of the peak amplitude of the detected portion.

A further embodiment of any of the foregoing methods can further include comparing, via a comparator, the detection portion with the second sub-peak threshold.

A further embodiment of any of the foregoing methods, wherein the calculated could metric is selected from the list consisting of liquid water content, droplet size distributions, and ice/liquid water ratios.

Some embodiments relate to a system for determining a metric of a cloud atmosphere. The system includes a light projector configured to project a pulse of light into a cloud atmosphere. The system includes a light sensor having a detection surface aligned with the laser projector so as to detect a portion of the projected pulse of light backscattered by the cloud atmosphere. The light sensor is further configured to generate, at an output port of the light sensor, a detection signal indicative of the detected portion. The system includes a logarithm amplifier having an input port electrically coupled to the output port of the detector so as to receive therefrom the detection signal. The logarithm amplifier is configured to generate, at an output port of the logarithm amplifier, an amplified signal indicative of a logarithm of the detection signal. The system includes a peak detector having an input port electrically coupled to the output port of the logarithm amplifier so as to receive therefrom the amplified signal. The peak detector is configured to generate, at an output port of the peak detector, a peak signal indicative of a peak amplitude of an amplified signal. The system includes a timer configured to determine a time difference between a first reference time and a second reference time. The first reference time corresponds to either a time at which the peak amplitude of a logarithm signal occurs or a time at which the amplitude of the logarithm signal equals or crosses a first sub-peak threshold. The second reference time corresponds to a time at which the amplitude of the logarithm signal equals or crosses a second sub-peak threshold. The system also includes a cloud metric calculator. The cloud metric calculator is configured to calculate, based on the peak signal, a backscatter coefficient. The cloud metric calculator is further configured to calculate, based on the determined time difference between the first reference time and the second reference time, an optical extinction coefficient. The cloud metric calculator is further configured to calculate, based on the calculated backscatter and optical extinction coefficients, the metric of the cloud atmosphere.

A further embodiment of the foregoing system can further include a threshold generator having an input port electrically coupled to the output port of the peak detector so as to receive therefrom the peak signal. The threshold generator can be configured to generate, at an output port of the threshold generator, a threshold signal indicative of a predetermined fraction of the peak signal.

A further embodiment of any of the foregoing systems can further include a comparator having two input ports electrically coupled to the output ports of the logarithm amplifier and the threshold generator so as to receive therefrom the amplifier signal and the threshold signal, respectively. The comparator can be configured to generate, at an output port of the comparator, a comparator signal indicative of a comparison of the amplifier and threshold signals.

While the invention has been described with reference to an exemplary embodiment(s), it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for determining a metric of a cloud atmosphere near a flying aircraft equipped with the system, the system comprising:
   a light projector that projects a pulse of light into a cloud atmosphere;
   a light sensor that detects a detected portion of the projected pulse of light backscattered by the cloud atmosphere;
   a peak detector that determines a peak amplitude of the detected portion;
   a sub-peak threshold generator that generates, based on the peak amplitude of the detected portion, first and second sub-peak thresholds that are predetermined fractions of the peak amplitude determined by the peak detector, the first sub-peak threshold having a greater amplitude than the second sub-peak threshold;
   a timer that determines a time difference between a first post-peak reference time and a second post-peak reference time, the first post-peak reference time corresponding to a time at which the amplitude of the detected portion equals or crosses the first sub-peak threshold, and the second post-peak reference time corresponding to a time at which the amplitude of the detected portion equals or crosses the second sub-peak threshold;
   one or more processors; and
   computer-readable memory encoded with instructions that, when executed by the one or more processors, cause the system to:
      calculate, based on the peak amplitude of the detected portion, a backscatter coefficient;
      calculate, based on the time difference between the first and second post-peak reference times, an optical extinction coefficient;
      calculate, based on the calculated backscatter and optical extinction coefficients, the metric of the cloud atmosphere; and
      communicate the cloud metric to the flying aircraft.

2. The system of claim 1, wherein the light sensor is further configured to generate a detection signal indicative of the detected portion.

3. The system of claim 2, wherein the peak detector is further configured to generate a peak signal indicative of the peak amplitude of the detection signal.

4. The system of claim 1, further comprising:
   a logarithm amplifier configured to generate a logarithm signal based on a logarithm of the detected portion.

5. The system of claim 2, further comprising:
   a logarithm amplifier configured to generate a logarithm signal based on a logarithm of the detection signal,
   wherein the peak detector is further configured to generate a peak signal indicative of peak amplitude of the logarithm signal.

6. The system of claim 1, further comprising:
   a comparator configured to compare the detection portion with the second first sub-peak threshold.

7. The system of claim 1, wherein the
   comparator is further configured to compare the detection signal with the second sub-peak threshold, and
   wherein the comparator is further configured to generate a comparison signal indicative of a comparison of the detection signal and the first and second sub-peak thresholds.

8. The system of claim 1, wherein the calculated could metric is selected from the list consisting of:
   liquid water content;
   droplet size distributions; and
   ice/liquid water ratios.

9. A method for determining a metric of a cloud atmosphere near a flying aircraft equipped with a system for performing the method, the method comprising:
   projecting, via a light projector, a pulse of light into a cloud atmosphere;
   detecting, via a light sensor, a detected portion of the projected pulse of light backscattered by the cloud atmosphere;
   determining, via a peak detector, a peak amplitude of the detected portion;
   generating, by a sub-peak threshold generator, first and second sub-peak thresholds based on the peak amplitude of the detected portion, the first and second sub-peak thresholds are predetermined fractions of the peak amplitude determined by the peak detector, the first sub-peak threshold having a greater amplitude than the second sub-peak threshold;

determining, via a timer, a time difference between a first post-peak reference time and a second post-peak reference time, the first post-peak reference time corresponding to a time at which the amplitude of the detected portion equals or crosses the first sub-peak threshold, and the second post-peak reference time corresponding to a time at which the amplitude of the detected portion equals or crosses the second sub-peak threshold;

calculating, based on the peak amplitude of the detected portion via a processor, a backscatter coefficient;

calculating, based on the time difference between the first post-peak reference time and the second post-peak reference time via a processor, an optical extinction coefficient;

calculating, based on the calculated backscatter and optical extinction coefficients via a processor, the metric of the cloud atmosphere; and communicating the cloud metric to the flying aircraft.

10. The method of claim 9, further comprising:
determining, via a logarithm amplifier, a logarithm of the detected portion.

11. The method of claim 9, further comprising:
comparing, via a comparator, the detection portion with the second first and second sub-peak thresholds.

12. The method of claim 9, wherein the calculated could metric is selected from the list consisting of:
liquid water content;
droplet size distributions; and
ice/liquid water ratios.

13. A system for determining a metric of a cloud atmosphere near a flying aircraft equipped with the system, the system comprising:
a light projector configured to project a pulse of light into a cloud atmosphere;
a light sensor having a detection surface aligned with the laser projector so as to detect a portion of the projected pulse of light backscattered by the cloud atmosphere, the light sensor further configured to generate, at an output port of the light sensor, a detection signal indicative of the detected portion;
a logarithm amplifier having an input port electrically coupled to the output port of the detector so as to receive therefrom the detection signal, the logarithm amplifier configured to generate, at an output port of the logarithm amplifier, an amplified signal indicative of a logarithm of the detection signal;
a peak detector having an input port electrically coupled to the output port of the logarithm amplifier so as to receive therefrom the amplified signal, the peak detector configured to generate, at an output port of the peak detector, a peak signal indicative of a peak amplitude of an amplified signal;
a sub-peak threshold generator that generates, based on the peak amplitude of the detected portion, first and second sub-peak thresholds that are predetermined fractions of the peak amplitude determined by the peak detector, the first sub-peak threshold having a greater amplitude than the second sub-peak threshold;
a timer configured to determine a time difference between a first post-peak reference time and a second post-peak reference time, the first post-peak reference time corresponding to a time at which an amplitude of the logarithm signal equals or crosses the first sub-peak threshold, the second post-peak reference time corresponding to a time at which the amplitude of the logarithm signal equals or crosses the second sub-peak threshold; and
a cloud metric calculator configured to:
calculate, based on the peak signal, a backscatter coefficient;
calculate, based on the determined time difference between the first post-peak reference time and the second post-peak reference time, an optical extinction coefficient;
calculate, based on the calculated backscatter and optical extinction coefficients, the metric of the cloud atmosphere; and
communicate the cloud metric to the flying aircraft.

14. The system of claim 13, wherein the amplifier further comprises:
a comparator having two input ports electrically coupled to the output ports of the logarithm amplifier and the threshold generator so as to receive therefrom the amplifier signal and the threshold signal, respectively, the comparator configured to generate, at an output port of the comparator, a comparator signal indicative of a comparison of the amplifier and threshold signals.

* * * * *